(12) United States Patent  (10) Patent No.: US 8,947,708 B2
Mori  (45) Date of Patent: Feb. 3, 2015

(54) INFORMATION PROCESSING APPARATUS, METHOD FOR CONTROLLING AN INFORMATION PROCESSING APPARATUS, AND IMAGE FORMING SYSTEM

(71) Applicant: Shinya Mori, Tokyo (JP)

(72) Inventor: Shinya Mori, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 120 days.

(21) Appl. No.: 13/687,508

(22) Filed: Nov. 28, 2012

(65) Prior Publication Data

US 2013/0141760 A1     Jun. 6, 2013

(30) Foreign Application Priority Data

Dec. 5, 2011   (JP) ................................ 2011-266021

(51) Int. Cl.
  *G06F 3/12*    (2006.01)
  *G06K 15/00*   (2006.01)
(52) U.S. Cl.
  CPC ............ *G06F 3/1201* (2013.01); *G06F 3/1204* (2013.01); *G06F 3/121* (2013.01); *G06F 3/1261* (2013.01); *G06F 3/1288* (2013.01)
  USPC ........ 358/1.15; 358/1.16; 358/1.13; 358/1.14

(58) Field of Classification Search
  CPC .... G06F 3/1201; G06F 3/1261; G06F 3/1248
  See application file for complete search history.

(56) References Cited

U.S. PATENT DOCUMENTS

2005/0162690 A1* 7/2005 Eom ............................ 358/1.15
2006/0117369 A1* 6/2006 Lee ................................ 725/114

FOREIGN PATENT DOCUMENTS

JP   11-203091    7/1999
JP   2001-318777  11/2001

* cited by examiner

*Primary Examiner* — Dov Popovici
(74) *Attorney, Agent, or Firm* — Harness, Dickey & Pierce, P.L.C.

(57) ABSTRACT

An information processing apparatus is connected to a first image forming apparatus and another information processing apparatus over a network. The information processing apparatus includes an apparatus information managing unit that registers, to a storage unit, apparatus information related to the first image forming apparatus and a second image forming apparatus directly connected to the other information processing apparatus; a first request transmitting unit that transmits, to the first image forming apparatus, a first request to form and output an image; and a second request transmitting unit that transmits, to the other information processing apparatus, a second request to cause the second image forming apparatus to form and output an image.

7 Claims, 6 Drawing Sheets

| REQUEST DESTINATION ID | HOST NAME | HOST TYPE | APPARATUS NAME | FUNCTION TABLE ID | |
|---|---|---|---|---|---|
| 1 | mfp3a | MFP | Device A | 001 | ... |
| 2 | mfp3b | MFP | Device B | 002 | |
| 3 | pc2 | PC | Device C | 003 | |
| ... | | | | | |

| REQUEST DESTINATION APPARATUS INFORMATION | REQUESTOR INFORMATION | PRINT DATA |
|---|---|---|
| JOB ID | | |

FIG.8

| REQUEST DESIGNATION PC INFORMATION | REQUEST DESTINATION APPARATUS INFORMATION | PRINT DATA |
|---|---|---|
| JOB ID | REQUESTOR INFORMATION | |

INFORMATION PROCESSING APPARATUS, METHOD FOR CONTROLLING AN INFORMATION PROCESSING APPARATUS, AND IMAGE FORMING SYSTEM

CROSS-REFERENCE TO RELATED APPLICATIONS

The present application claims priority to and incorporates by reference the entire contents of Japanese Patent Application No. 2011-266021 filed in Japan on Dec. 5, 2011.

BACKGROUND OF THE INVENTION

1. Field of the Invention

The present invention relates to an information processing apparatus, a method for controlling an information processing apparatus, and an image forming system.

2. Description of the Related Art

Recently, electronization of information has become more encouraged, and image processing apparatuses such as printers or facsimiles used for outputting electronic information and those such as scanners used for electronizing documents have come to play essential roles accordingly. Such image processing apparatuses are often configured as multifunction peripherals (MFPs) that can be used as a printer, a facsimile, a scanner, and a copier, by being provided with an image capturing function, an image forming function, and a communication function, for example.

Among these image processing apparatuses, those used for outputting electronized information generally receive a print job generated by an information processing apparatus such as a personal computer (PC), and execute an image forming output based on the print job. In a method disclosed in Japanese Patent Application Laid-open No. 2001-318777, for example, when an image forming apparatus having received a print job fails and becomes incapable of executing an output, a print job is forwarded to another image forming apparatus and the image forming apparatus is caused to execute the output, in place of the failed image forming apparatus.

In the method disclosed in Japanese Patent Application Laid-open No. 2001-318777, because the print job needs to be forwarded, only an image forming apparatus connected to a network, such as a local area network (LAN), can be a substitute for the failed image forming apparatus. Therefore, an image forming apparatus connected only to the PC via a Universal Serial Bus (USB), for example, in other words, a local image forming apparatus cannot be a substitute for the failed image forming apparatus.

In a method conventionally practiced, a PC to which a local image forming apparatus is connected functions as a server, and another PC uses the server to cause the local image forming apparatus to execute an image forming output. However, in the conventional method, the setting operation needs to be performed for both the PC to which the local image forming apparatus is connected and the PC from which the print job is transmitted. Therefore, users who are unfamiliar with PC operations might experience difficulties.

Moreover, since only allowed to transmit a print job is a PC subjected to the setting operation, such a system does not deal with substitute printing in the case of a failure in an image forming apparatus.

Therefore, there is a need for an information processing apparatus capable of enabling an image forming apparatus locally connected thereto to execute substitute printing.

SUMMARY OF THE INVENTION

According to an embodiment, there is provided an information processing apparatus that is connected to a first image forming apparatus and another information processing apparatus over a network. The information processing apparatus includes an apparatus information managing unit that registers, to a storage unit, apparatus information related to the first image forming apparatus and a second image forming apparatus directly connected to the other information processing apparatus; a first request transmitting unit that transmits, to the first image forming apparatus, a first request to form and output an image; and a second request transmitting unit that transmits, to the other information processing apparatus, a second request to cause the second image forming apparatus to form and output an image.

According to another embodiment, there is provided a method for controlling an information processing apparatus that is connected to a first image forming apparatus and another information processing apparatus over a network. The method includes registering, to a storage unit, apparatus information related to the first image forming apparatus and a second image forming apparatus directly connected to the other information processing apparatus; transmitting, to the first image forming apparatus, a first request to form and output an image; and transmitting, to the other information processing apparatus, a second request to cause the second image forming apparatus to form and output an image.

According to still another embodiment, there is provided an image forming system that includes a first information processing apparatus, a second information processing apparatus, and a first image forming apparatus that are connected to each other over a network; and a second information apparatus connected to the second information processing apparatus. The first information processing apparatus includes an apparatus information managing unit that registers, to a storage unit, apparatus information related to the first and second image forming apparatuses; a first request transmitting unit that transmits, to the first image forming apparatus, a first request to form and output an image; and a second request transmitting unit that transmits, to the second information processing apparatus, a second request to cause the second image forming apparatus to transmit and output an image. The second information processing system includes a third request transmitting unit that transmits, to the second image forming apparatus, a third request to form and output the image in response to the second request.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will now be explained in detail with reference to the accompanying drawings. Explained in the embodiment as an example is a system in which an image forming apparatus directly connected to a network and an image forming apparatus locally (directly) connected to an information processing apparatus, such as a personal computer (PC), are both present, and the image forming apparatus locally connected to the PC is caused to execute substitute printing when the image forming apparatus directly connected to the network fails and becomes incapable of executing an output.

Figure 1:
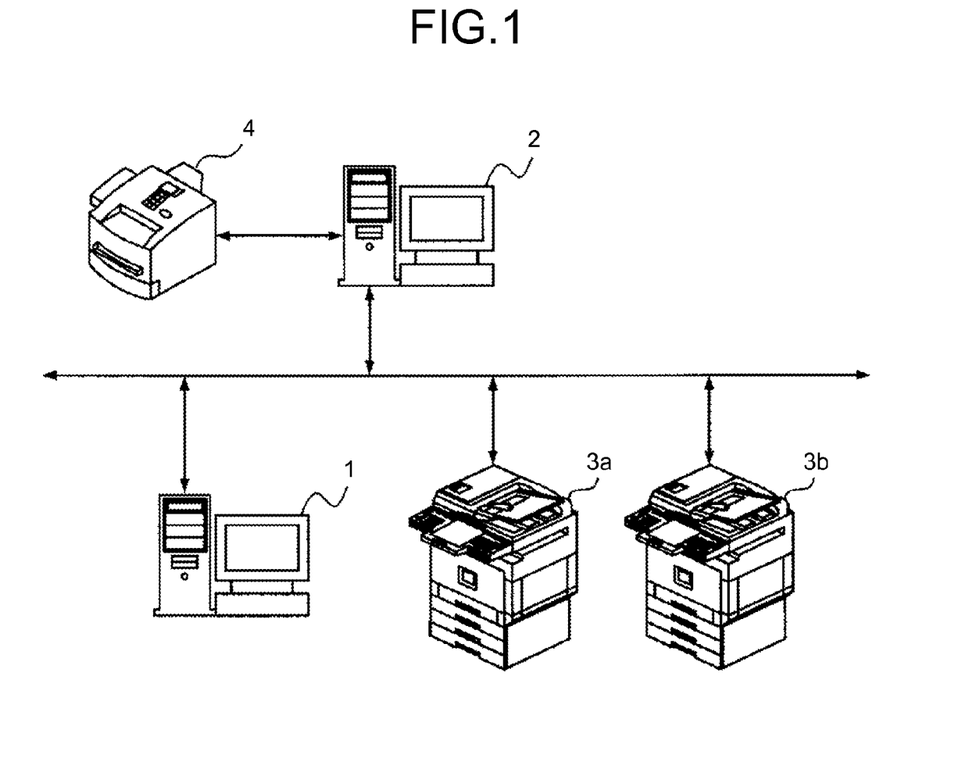
FIG. 1 is a schematic illustrating an example of a system according to an embodiment of the present invention.

FIG. 1 is a schematic of an example of the system according to the embodiment. As illustrated in FIG. 1, the system according to the embodiment includes a PC 1, a PC 2, a network MFP 3a, a network MFP 3b, and a local printer 4. In the embodiment, the PC 1, the PC 2, the network MFP 3a, and the network MFP 3b are connected over a network such as a LAN, and the local printer 4 is connected only to the PC 2. The PC 1 is an information processing terminal operated by a user, and functions as a transmission source of a print job in the embodiment.

The PC 2 is an information processing terminal operated by a user, in the same way as the PC 1, and the local printer 4 is directly connected to the PC 2 via an interface such as a USB. Software programs for implementing essential functions according to the embodiment are installed on the PC 1 and the PC 2.

The network MFP 3a and the network MFP 3b are image processing apparatuses connected over the network, and are provided with a combination of image processing functions such as a printer function, a scanner function, and a facsimile function. The network MFPs 3a and 3b each receive a print job from the PC 1 or the PC 2 over the network so as to form and output an image.

The local printer 4 is an image forming apparatus directly connected to the PC 2, and is directly connected to the PC 2 via an interface such as a USB, as mentioned earlier. In the embodiment, being "directly connected" means being locally connected via an interface such as an USB that allows a plurality of apparatuses to communicate with only one PC being a host, or an interface such as a serial circuit that only allows one-to-one communications, instead of being connected over a network such as a LAN that enables many-to-many communications.

In other words, in the embodiment, the local printer 4 being "directly connected" to the PC 2 means that the local printer 4 is connected to the PC 2 over another network that is different from the LAN over which the PC 2 is connected to the PC 1 and the network MFPs 3a and 3b. As an interface for connecting the PC 2 and the local printer 4, an Institute of Electrical and Electronics Engineers (IEEE) interface may also be used, besides a USB or a serial circuit mentioned earlier.

Alternatively, the PC 2 and the local printer 4 may be connected via a wireless interface. Specifically, a Bluetooth (registered trademark) connection may be used. The local printer 4 forms and outputs an image based on a command issued from the PC 2. An essential feature of the embodiment is enabling the local printer 4 to execute substitute printing through intermediation by the PC 2.

Figure 2:
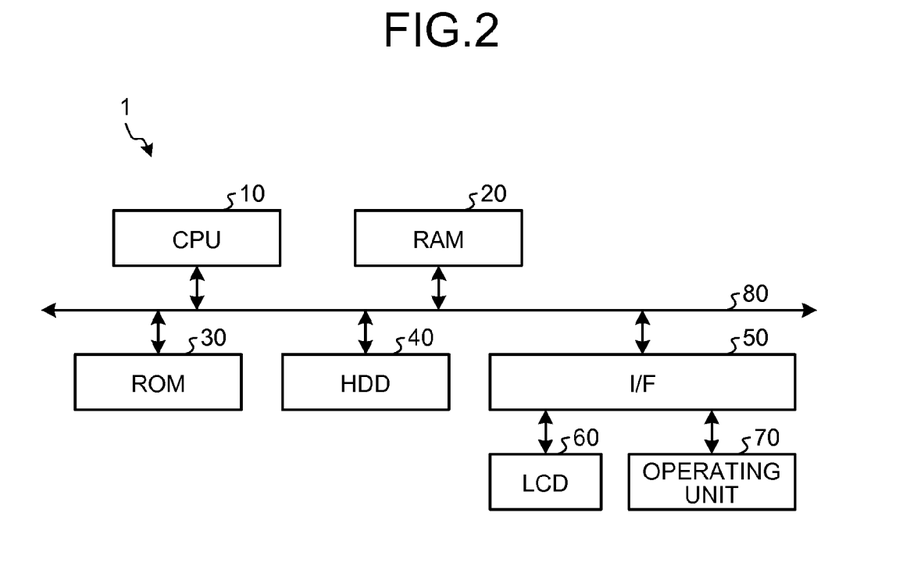
FIG. 2 is a block diagram schematically illustrating a hardware configuration of an information processing apparatus according to the embodiment.

A hardware configuration of the PC 1 and the PC 2 according to the embodiment will now be explained. FIG. 2 is a block diagram illustrating a hardware configuration of the information processing apparatus (i.e., each of the PC 1 and the PC 2) according to the embodiment. As illustrated in FIG. 2, the PC 1 and the PC 2 according to the embodiment have the same configuration as a general server or a PC. In other words, each of the PC 1 and the PC 2 according to the embodiment include a central processing unit (CPU) 10, a random access memory (RAM) 20, a read-only memory (ROM) 30, a hard disk drive (HDD) 40, and an interface (I/F) 50 that are connected via a bus 80. A liquid crystal display (LCD) 60 and an operating unit 70 are connected to the I/F 50.

The CPU 10 is a computing unit, and controls overall operations of the PC 1 or the PC 2. The RAM 20 is a volatile storage medium from which and to which information can be read and written at a high speed, and used as a working area when the CPU 10 processes information. The ROM 30 is a read-only non-volatile storage medium, and stores therein computer programs such as firmware. The HDD 40 is a non-volatile storage medium from which and to which information can be read and written, and stores therein various control programs such as an operating system (OS) and application programs.

The I/F 50 connects and controls the bus 80 and various pieces of hardware and networks. The LCD 60 is a GUI. The operating unit 70 is a user interface such as a keyboard, a mouse, and a touch panel for allowing a user to enter information to the PC 1 or the PC 2. User interfaces such as the LCD 60 and the operating unit 70 may be omitted.

Using such a hardware configuration, a software controller is implemented by reading a computer program stored in a storage medium such as the ROM 30, the HDD 40, or an optical disk not illustrated onto the RAM 20, and executing the computer program under control of the CPU 10. The functional block implementing the functions of each of the PC 1 and the PC 2 according to the embodiment is configured by a combination of the hardware and the software controller.

Figure 3:
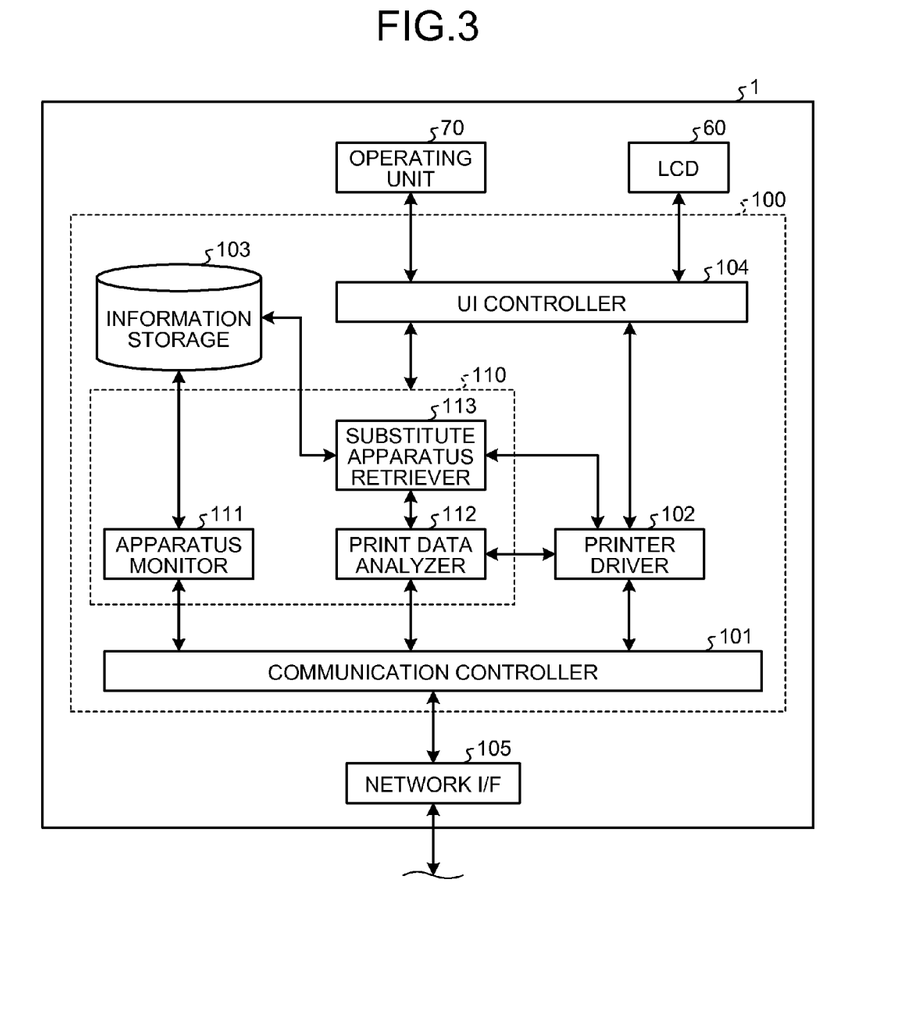
FIG. 3 is a block diagram illustrating a functional configuration of a PC according to the embodiment.

A functional configuration of each of the PC 1 and the PC 2 according to the embodiment will now be explained with reference to FIG. 3. As illustrated in FIG. 3, each of the PC 1 and the PC 2 according to the embodiment includes a controller 100 and a network I/F 105, in addition to the LCD 60 and the operating unit 70. The controller 100 includes a communication controller 101, a printer driver 102, an information storage 103, a user interface (UI) controller 104, and an apparatus coordination controller 110. The apparatus coordination controller 110 includes an apparatus monitor 111, a print data analyzer 112, and a substitute apparatus retriever 113.

The network I/F 105 is an interface for allowing the PC (the PC 1 or the PC 2) to communicate with other apparatuses over the network, and an Ethernet (registered trademark) interface, a USB interface, or the like is used. The network I/F 105 is implemented by the I/F 50 illustrated in FIG. 2.

The controller 100 is configured by a combination of software and hardware. Specifically, the controller 100 is implemented by hardware such as an integrated circuit and a software controller that is implemented by loading a computer program stored in the ROM 30, a non-volatile memory, or a non-volatile storage medium such as the HDD 40 or an optical disk onto a volatile memory (hereinafter, referred to as a memory) such as the RAM 20, and causing the CPU 10 to perform operations based on the computer program. The controller 100 controls the entire PC.

The communication controller 101 receives information from other apparatuses via the network I/F 105, and transmits information to other apparatuses via the network I/F 105. The printer driver 102 generates a print job for causing the network MFP 3a or 3b, or the local printer 4 to form and output an image according to an operation performed by an application running on the PC 1 or the PC 2, and transmits the print job to the communication controller 101. The printer driver 102 according to the embodiment determines whether an image forming apparatus designated by a user as an apparatus to be used to form and output an image is capable of forming and outputting the image, and if the designated image forming apparatus is incapable of forming and outputting the image, notifies the substitute apparatus retriever 113 of the fact.

In FIG. 3, the printer driver 102 is illustrated as a single block. However, in practice, a plurality of printer drivers corresponding to a plurality of image forming apparatuses is installed. Therefore, a PC using a plurality of image forming apparatuses includes a plurality of the printer drivers 102. In the same manner as the network MFPs 3a and 3b, the local printer 4 becomes available to the PC 1 or the PC 2 when a printer driver corresponding to the local printer 4 is installed in the PC 1 or the PC 2.

Figure 4:
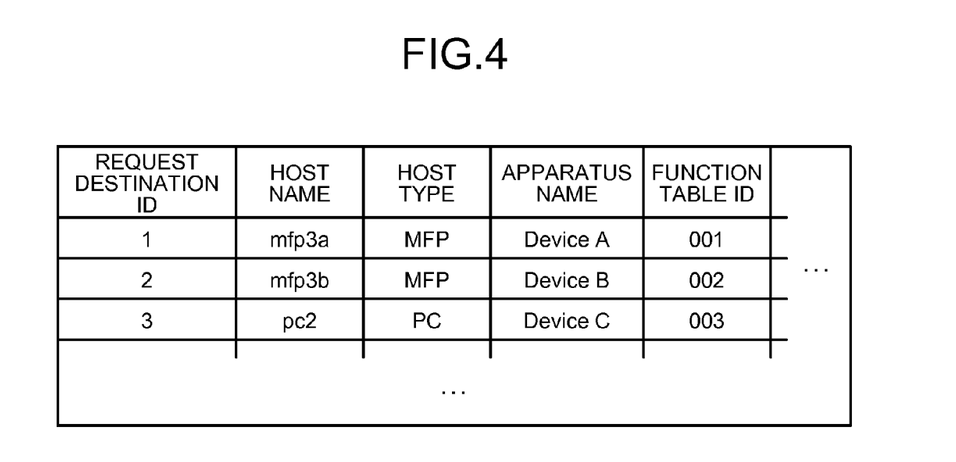
FIG. 4 is a schematic illustrating information included in an apparatus information table according to the embodiment.

The information storage 103 stores therein information about available image forming apparatuses. Information included in the information storage 103 according to the embodiment will now be explained with reference to FIG. 4. As illustrated in FIG. 4, the information storage 103 according to the embodiment stores therein an apparatus information table. The apparatus information table describes information in which "request destination ID", "host name", "host type", "apparatus name", and "function table ID" are associated with each other for each available image forming apparatus. The "request destination ID" is identification information for identifying an available image forming apparatus in database. The "host name" is network identification information for uniquely identifying a destination on the network to be used when a print job is transmitted to the image forming apparatus over the network.

The "host type" is information indicating whether network identification information indicated as a "host name" indicates an image processing apparatus such as the network MFPs 3a or 3b, or an information processing apparatus such as the PC 1 and the PC 2. In FIG. 4, "MFP" represents an image processing apparatus such as the network MFPs 3a and 3b, and "PC" represents an information processing apparatus such as the PC 1 and the PC 2. In other words, if the "host type" is "PC", the entity receiving the print job on the network is the PC 2 to which the local printer 4 is connected, and the entity actually executing the image forming output is the local printer 4.

The "apparatus name" is the model name of each of the image forming apparatuses, and indicates the model name of each of the image forming apparatuses specified with network identification information such as the network MFPs 3a and 3b, and the local printer 4. The "function table ID" is identification information for identifying a function table that is information in which functions of each of the image forming apparatuses are listed. The function table is stored in the information storage 103, in the same manner as the apparatus information table.

Figure 5:
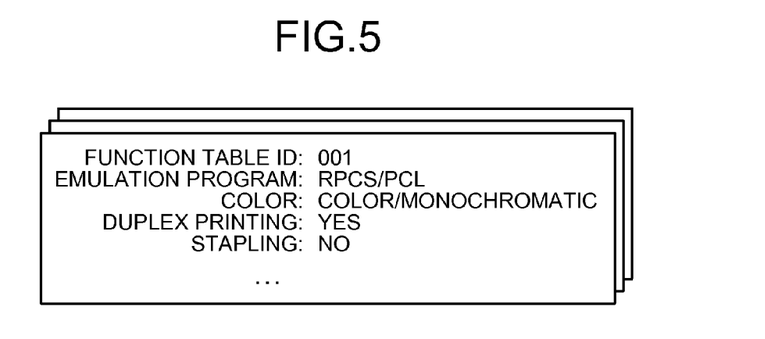
FIG. 5 is a schematic illustrating information included in a function table according to the embodiment.

FIG. 5 is a schematic illustrating information included in the function table according to the embodiment. As illustrated in FIG. 5, the function table according to the embodiment includes information such as "emulation program", "color", "duplex printing", and "stapling" correspondingly to each function table ID. The "emulation program" is information indicating a type of a computer program for causing a corresponding image forming apparatus to operate. The "color" is information indicating whether color printing is supported in the corresponding image forming apparatus. The "duplex printing" is information indicating whether duplex printing is supported in the corresponding image forming apparatus. The "stapling" is information indicating whether stapling is supported in the corresponding image forming apparatus.

The UI controller 104 controls exchange of information between a user interface, such as the operating unit 70 and the LCD 60, and components included in the controller 100, such as the apparatus coordination controller 110 and the printer driver 102. For example, the UI controller 104 notifies the apparatus coordination controller 110 and the printer driver 102 of information entered by a user who is making operations on the operating unit 70. The UI controller 104 also displays a GUI for the apparatus coordination controller 110 and the printer driver 102, for example, on the LCD 60.

The apparatus coordination controller 110 provides functions for enabling the local printer 4 to perform substitute printing. The apparatus monitor 111 monitors image processing apparatuses currently available over the network, and updates the tables stored in the information storage 103. This function of the apparatus monitor 111 enables the controller 100 to recognize image processing apparatuses currently available over the network, and enables the PC 1 to recognize the local printer 4 connected to the PC 2.

At the time of starting the operation of the PC 1 and the PC 2, registered in the apparatus information table stored in the information storage 103 are only the image forming apparatuses for which their printer drivers have been installed on the PC 1 or the PC 2. For example, in the example illustrated in FIG. 1, information about the network MFPs 3a and 3b is registered in the apparatus information table of the PC 1, and information about the network MFPs 3a and 3b, and the local printer 4 is registered in the apparatus information table of the PC 2. The registration of the information is performed by the corresponding printer driver.

The apparatus monitor 111 included in the PC 1 and the apparatus monitor 111 included in the PC 2 exchange the information, and thus, the information about the local printer 4 is also registered in the apparatus information table stored in the information storage 103 in the PC 1. At this time, the host name information about the local printer 4 is registered as "the PC 2", and the host type is registered as "PC", as explained earlier in FIG. 4. In this manner, in the embodiment, the printer driver 102 and the apparatus monitor 111 function as an apparatus information manager.

The print data analyzer 112 analyzes a print job received over the network, and performs processing corresponding to the information included in the print job. This function of the print data analyzer 112 enables the PC 2 to which the local printer 4 is connected to cause the local printer 4 to execute an image forming output based on the print job received over the network.

When the printer driver 102 determines that an image forming apparatus firstly designated by a user is incapable of executing an image forming output, the substitute apparatus retriever 113 retrieves an apparatus that can perform substitute printing based on the apparatus information table and the function table stored in the information storage 103, in response to the notification received from the printer driver 102. Because the information about the local printer 4 is stored in the apparatus information table, even the PC 1 can send a request for substitute printing to the local printer 4. This is one of the essential features of the embodiment.

Figure 6:
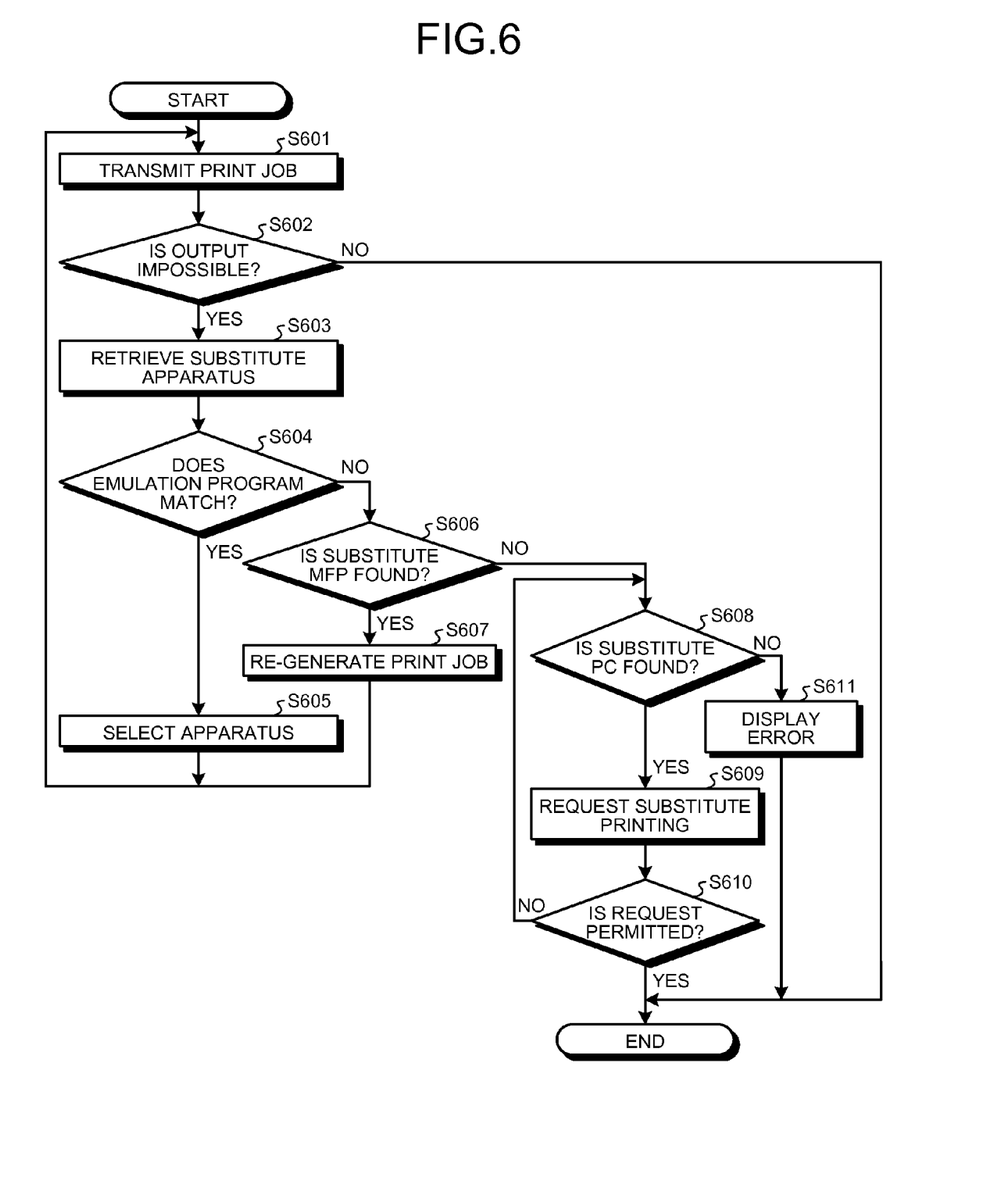
FIG. 6 is a flowchart illustrating an operation performed by the PC according to the embodiment.

An operation performed by the system according to the embodiment will now be explained. FIG. 6 is a flowchart illustrating an operation performed by the PC 1 that is a transmission source of a print job in the system according to the embodiment. As illustrated in FIG. 6, in the PC 1, the printer driver 102 transmits a print job in response to a user operation (S601). The printer driver 102 then determines whether the image processing apparatus being a destination of the print job is capable of forming and outputting the image specified by the print job (S602).

At S602, the printer driver 102 determines whether the destination is capable of forming and output the image based on a response received from the destination of the print job transmitted at S601, for example. Specifically, if the network MFP 3*a* or 3*b* being the destination image forming apparatus does not respond within a predetermined time period from when the print job is transmitted, the printer driver 102 determines that the destination image forming apparatus is incapable of executing the output. Alternatively, the printer driver 102 may determine whether the destination apparatus is operating based on a response to a ping. Still alternatively, if the destination apparatus is capable of issuing a notification indicating that the destination apparatus is incapable of forming and outputting an image in response to a print job received, the PC 1 may determine, based on such a notification, that the destination apparatus cannot form and output the image.

In FIG. 6, although the PC 1 determines whether the destination apparatus is capable of forming and outputting an image after transmitting a print job, the PC 1 may alternatively determine whether the destination is capable of forming and outputting an image before transmitting a print job. If the PC 1 determines that the destination apparatus can form and output the image as a result of determination at S602 (No at S602), the PC 1 ends the process. By contrast, if the destination image processing apparatus is incapable of forming and outputting an image for the print job transmitted (Yes at S602), the printer driver 102 notifies the substitute apparatus retriever 113 of the fact that the destination image processing apparatus is incapable of executing the output. In response to the notification, the substitute apparatus retriever 113 retrieves a substitute apparatus by referring to the apparatus information table stored in the information storage 103 (S603).

The substitute apparatus retriever 113 according to the embodiment first checks whether there is any apparatus having a matching emulation program (S604). In other words, the substitute apparatus retriever 113 retrieves an apparatus having the same "emulation program", explained with reference to FIG. 5, as that of the apparatus to which the print job is transmitted at S601. This is because if the emulation program is the same, the apparatus can use the print job already generated as it is.

If there is an apparatus having a matching emulation program (Yes at S604), the substitute apparatus retriever 113 selects the apparatus as the substitute apparatus (S605), and notifies the printer driver 102 of the "host name" of the apparatus thus selected. In response, the printer driver 102 transmits the print job using this "host name" (S601), and repeats the processes at S601 and thereafter. When the printer driver 102 transmits a print job after S605, because the same emulation program is used, the printer driver 102 transmits the print job already generated as it is.

If there is no apparatus having a matching emulation program (No at S604), the substitute apparatus retriever 113 checks whether there is any apparatus having "host type" specified as "MFP" (S606). As a result of determination at S606, if a substitute MFP is found (Yes at S606), the substitute apparatus retriever 113 selects the apparatus as the substitute apparatus, and notifies the printer driver 102 of the "host name" of the apparatus thus selected.

At this time, because the print job is transmitted to an apparatus with a different emulation program, the printer driver 102 re-generates a print job corresponding to the apparatus thus selected (S607), and transmits the print job (S601). The same process is repeated at S601 and thereafter.

Figure 7:
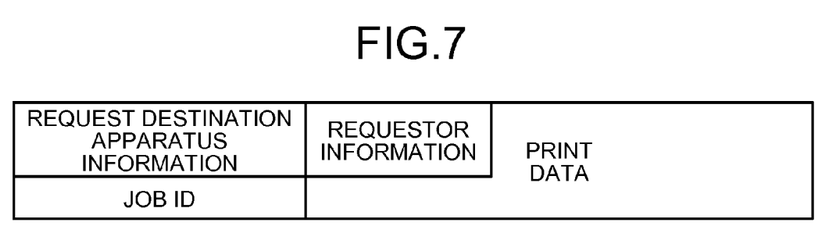
FIG. 7 is a schematic illustrating information included in a substitute printing request according to the embodiment.

The print job transmitted after S605 or S607, that is, information included in request data for substitute printing is illustrated in FIG. 7. As illustrated in FIG. 7, substitute printing request data transmitted to the network MFP 3*a* or 3*b* includes "request destination apparatus information", "requestor information", "job ID", and "print data". The "job ID" is identification information for uniquely identifying a print job. The "request destination apparatus information" is information for identifying the network MFP 3*a* or 3*b* which is a destination to which a substitute printing request is transmitted. An "apparatus name" or a "host name" as illustrated in FIG. 4 is used as the "request destination apparatus information", for example.

Explained in the embodiment is an example in which an "apparatus name" or a "host name" is used as the information for identifying each apparatus on the network. However, any information that can uniquely identify an apparatus, such as an internet protocol (IP) address or a media access control (MAC) address, may also be used in the same manner. The information used as the "request destination apparatus information" may be any identification information stored in a manner associated with the corresponding apparatus in the apparatus information table illustrated in FIG. 4.

The "requestor information" is identification information for identifying a requestor of substitute printing, that is, the PC 1 in the example illustrated in FIG. 6. Identification information such as the "host name", the IP address, or the like of the PC 1, who is the requestor of the substitute printing, as well as the user name of the user having logged into the PC 1, may be used as the "requestor information". When a user name is used, it becomes also possible to determine the authority level of the user of the request destination apparatus.

The "print data" is image data that is the subject to be formed and output. The "print data" transmitted to the network MFP 3*a* or 3*b* is image information that is described in a format supported by the apparatus, e.g., in the Page Description Language (PDL). Such image information is generated by the printer driver 102 corresponding to each apparatus.

As a result of determination at S606, if no substitute MFP is found (No at S606), the substitute apparatus retriever 113 checks whether there is any apparatus having "host type" specified as "PC" (S608). As a result of determination at S608, if a substitute PC, in other words, a local printer is found (Yes at S608), the substitute apparatus retriever 113 selects the apparatus as the substitute apparatus, and notifies the printer driver 102 of the "host name" of the apparatus thus selected.

Figure 8:
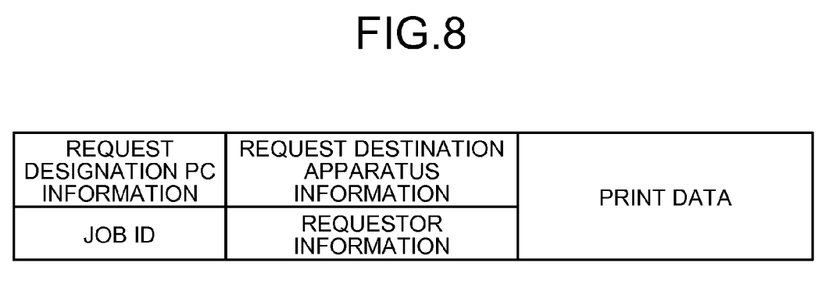
FIG. 8 is a schematic illustrating information included in another substitute printing request according to the embodiment.

Upon receiving the "host name" of the PC as the substitute apparatus, the printer driver 102 transmits a substitute printing request to this PC (S609). In the embodiment, the PC 1 transmits the substitute printing request for the local printer 4 to the PC 2. In other words, the printer driver 102 functions as a substitute request transmitter that transmits a substitute request to the PC 2. FIG. 8 is a schematic illustrating information included in the substitute printing request transmitted at S609.

As illustrated in FIG. 8, the substitute printing request according to the embodiment includes "request destination PC information", as well as the information explained with reference to FIG. 7. For the "request destination PC information", the "host name" illustrated in FIG. 4 is used. In other words, "request destination PC information" is not information identifying the local printer 4 actually forming and outputting an image, but information identifying the PC 2 to which the local printer 4 is connected. The "request destination PC information" includes in the substitute printing request, and thus, the PC 2 that is the destination of the request is enabled to recognize that the information thus received is a request for substitute printing addressed to the PC 2 itself, and to execute subsequent processes. A process performed by the PC 2 that is the destination of the request will be explained later.

The "print data" included in the substitute printing request is not information described in the PDL format, but is original data, such as text data, document data, or image data, that is the subject to be formed and output. For a general local printer 4, bitmap information is generated by a PC (the PC 2 in this example) connected to the local printer 4 and sent to the local printer 4, and the local printer 4 forms and outputs the image. Therefore, original image data is required in generating a bitmap when substitute printing is requested.

The PC 1 having requested the substitute printing waits for a notification from the request destination as to whether the substitute printing can be executed. If the substitute printing is permitted (Yes at S610), the PC 1 ends the process. If the substitute printing is not permitted, the substitute apparatus retriever 113 repeats the processes at S608 and thereafter, and issues a substitute printing request to a PC to which a substitute printing request has not been transmitted. If no substitute PC is found at S608 (No at S608), the substitute apparatus retriever 113 indicates an error (S611) to show that the image cannot be formed and output, and the process is ended. Through such a process, the operation performed by the PC 1 that is a transmission source of the print job according to the embodiment is ended.

Figure 9:
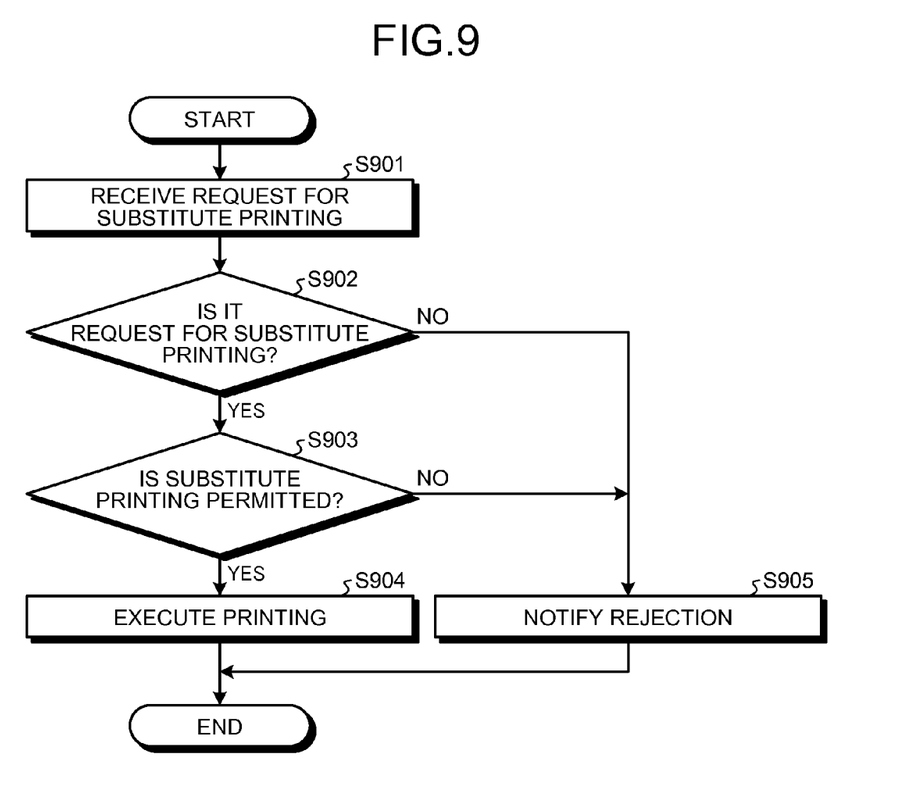
FIG. 9 is a flowchart illustrating an operation performed by another PC according to the embodiment.

An operation performed by the PC 2 to which a substitute printing request is transmitted in the embodiment, that is, the information processing apparatus to which the local printer 4 is connected will now be explained with reference to FIG. 9. As illustrated in FIG. 9, in the PC 2, when the apparatus coordination controller 110 receives a substitute printing request via the communication controller 101 (S901), the print data analyzer 112 refers to the "request destination apparatus information" in the substitute printing request, and checks whether the substitute printing request is for the PC 2 (S902).

Figure 10:
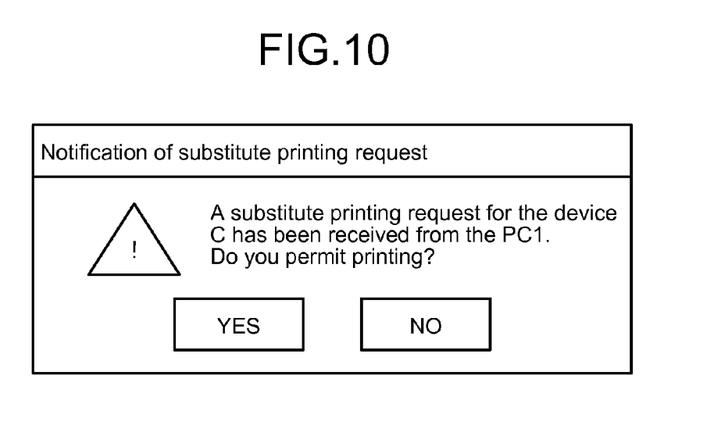
FIG. 10 is a schematic of a graphical user interface (GUI) for asking a user whether to permit a substitute printing request in the embodiment.

As a result of determination at S902, if the substitute printing request is for the PC 2 (Yes at S902), the print data analyzer 112 determines whether the substitute printing can be permitted (S903). At S903, the print data analyzer 112 displays, on the LCD 60, a GUI indicating that the substitute printing request is received and presenting an operating unit that allows a user to specify whether the substitute printing can be permitted, via the UI controller 104. FIG. 10 is a schematic illustrating an example of the GUI. If the substitute printing is specified to be permitted via a user operation performed on the operating unit 70, the print data analyzer 112 determines that the substitute printing is permitted. In other words, the print data analyzer 112 functions as a substitution permissibility determining unit.

Alternatively, at S903, the print data analyzer 112 may refer to the user name having logged into the requesting PC and included in the "requestor information" in the substitute printing request, as explained with reference to FIG. 8, and determine the authority level of the user identified by the user name (hereinafter, referred to as a requesting user) in the PC 2. If the requesting user is a user permitted to use the PC 2, the print data analyzer 112 may determine that the substitute printing is permitted.

Alternatively, at S903, the print data analyzer 112 may determine whether the substitute printing is permitted based on the processing load of the PC 2 or conditions of the local printer 4 at that time. For example, if the processing load of the PC 2 is high, or if the local printer 4 is busy or not available due to an error, the print data analyzer 112 determines to reject the substitute printing.

Furthermore, if conditions for accepting or rejecting substitute requests are predetermined, e.g., to accept or to reject all substitute requests, the print data analyzer 112 can determine whether the substitute printing is permitted based on the predetermined conditions.

If the substitute printing is permitted at S903 (Yes at S903), the print data analyzer 112 notifies the requesting PC 1 of a permission for the substitute printing. The print data analyzer 112 also requests the printer driver 102 corresponding to the local printer 4 to form and output the image, and forwards the print data included in the substitute printing request. In other words, the print data analyzer 112 functions as a substitute request processor. The local printer 4 then executes printing under the control of the printer driver 102 (S904), and the process is ended.

If the substitute printing request is not for the PC 2 at S902 (No at S902), or if the substitute printing is rejected at S903 (No at S903), the print data analyzer 112 notifies the requesting PC 1 of a rejection for the substitution (S905), and the process is ended. In this manner, the process performed by the PC 2 to which the substitute printing request is transmitted is ended.

In the manner described above, in the system according to the embodiment, information related to available image forming apparatuses is accumulated and managed in the form of an apparatus information table in the information storage 103 included in a PC that is a transmission source of a print job, and the information in the apparatus information table is shared over a network using the function of the apparatus monitor 111. Therefore, the presence of an image forming apparatus connected locally to a PC via an interface such as a USB, e.g., the local printer 4, can be informed to other PCs.

Therefore, the PC 1 to which the local printer 4 is not connected can transmit a substitute printing request to the PC 2 based on the information about the local printer 4 stored in the apparatus information table, using the function of the substitute apparatus retriever 113.

The PC 2 receiving the substitute printing request forms and outputs an image under the control of the printer driver 102 corresponding to the local printer 4, based on the "print data" included in the substitute printing request. Generally, a printer directly connected to a PC does not have an image processing function for generating bitmap data, and is enabled to form and output an image based on bitmap data generated by a PC. Therefore, by simply forwarding a print job intended to cause the network MFP 3a or 3b to print an image to the local printer 4, the local printer 4 cannot print the image.

In the system according to the embodiment, the above described problem can be solved because the PC 2, to which the local printer 4 is connected, causes the corresponding printer driver 102 to operate based on a substitute printing request, and generates bitmap data that enables the local printer 4 to form and output the image. In addition, an explicit permission is acquired from a user through a screen, such as one illustrated in FIG. 10, before the printer driver 102 corresponding to the local printer 4 is caused to operate based on the substitute printing request. Therefore, security of the PC 2 can be improved. Hence, the printer driver 102 is prevented from being operated by an unauthorized substitute printing request, and the substitute printing request is prevented from becoming a security hole.

As explained above, with the system according to the embodiment, an image forming apparatus locally connected to an information processing apparatus can be used for substitute printing.

In the embodiment explained above, it is assumed that substitute printing is performed when an error of forming and outputting an image occurs in a firstly-designated image forming apparatus. However, according to the embodiment, any print job can be transmitted to an image forming apparatus locally connected to a PC, without limitation to substitute print requests. Furthermore, in the embodiment, users only need to install the driver corresponding to an image forming apparatus locally connected to a PC to the PC. Therefore, the configuration of the entire system can be simplified, and the system can be realized without demanding users to set up complex configurations or to install the driver to other PCs, for example.

Furthermore, explained in the embodiment is an example in which image forming apparatuses such as the network MFPs 3a and 3b and the local printer 4 are used. However, the system according to the present invention is not limited to image forming apparatuses, and may be applied to such apparatuses that realize any other functions.

In other words, the present invention may be applied to a network system in which, in order to use an apparatus executing some process, processed data needs to be transmitted from a specific information processing terminal to that apparatus. The apparatus then can be enabled to process a piece of processed data retained by another information processing terminal that is not the specific information processing terminal.

Furthermore, by allowing a specific information processing terminal to intermediate execution of substitute processing, even when the substitute apparatus is different in performance or uses a different processing scheme, the substitute apparatus is enabled to process the processed data retained by another information processing terminal appropriately.

According to the present invention, an image forming apparatus locally connected to an information processing apparatus can be used for substitute printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that is connected to a first image forming apparatus and another information processing apparatus over a network, the information processing apparatus comprising:
   an apparatus information managing unit configured to register, to a storage unit, apparatus information related to the first image forming apparatus and a second image forming apparatus directly connected to the other information processing apparatus;
   a first request transmitting unit configured to transmit, to the first image forming apparatus, a first request to form and output an image;
   a second request transmitting unit configured to transmit, to the other information processing apparatus, a second request to cause the second image forming apparatus to form and output an image; and
   a substitute apparatus retrieving unit configured to retrieve a substitute apparatus from the first and second image forming apparatuses for forming and outputting the image based on the apparatus information thus registered when an image forming apparatus selected by a user among the first and second image forming apparatuses does not output the image,
   wherein when the second image forming apparatus is selected as the substitute apparatus, the second request transmitting unit is configured to transmit the second request to the other information processing apparatus,
   wherein the apparatus information includes information related to a type of a computer program that causes each of the first and second image forming apparatuses to operate, and
   the substitute apparatus retrieving unit is configured to preferentially select the image forming apparatus having the same type of the computer program as that of the image forming apparatus incapable of forming and outputting the image, as the substitute apparatus.

2. A method for controlling an information processing apparatus that is connected to a first image forming apparatus and another information processing apparatus over a network, the method comprising:
   registering, to a storage unit, apparatus information related to the first image forming apparatus and a second image forming apparatus directly connected to the other information processing apparatus;
   transmitting, to the first image forming apparatus, a first request to form and output an image;
   transmitting, to the other information processing apparatus, a second request to cause the second image forming apparatus to form and output an image; and
   retrieving, when an image forming apparatus selected by a user among the first and second image forming apparatuses does not output the image, a substitute apparatus from the first and second image forming apparatuses for forming and outputting the image based on the apparatus information thus registered,
   wherein when the second image forming apparatus is selected as the substitute apparatus, in the transmitting the second request, the second request is transmitted to the other information processing apparatus,
   wherein the apparatus information includes information related to a type of a computer program that causes each of the first and second image forming apparatuses to operate, and
   the retrieving includes preferentially selecting the image forming apparatus having the same type of the computer program as that of the image forming apparatus that does not output the image, as the substitute apparatus.

3. An image forming system comprising:
   a first information processing apparatus, a second information processing apparatus, and a first image forming apparatus that are connected to each other over a network, and a second image forming apparatus connected to the second information processing apparatus, wherein,
   the first information processing apparatus includes,
      an apparatus information managing unit configured to register, to a storage unit, apparatus information related to the first and second image forming apparatuses;

a first request transmitting unit that configured to transmit, to the first image forming apparatus, a first request to form and output an image; and a second request transmitting unit that configured to transmit, to the second information processing apparatus, a second request to cause the second image forming apparatus to transmit and output an image, the second information processing apparatus includes a third request transmitting unit that configured to transmit, to the second image forming apparatus, a third request to form and output the image in response to the second request, and a substitute apparatus retrieving unit configured to retrieve a substitute apparatus from the first and second image forming apparatuses for forming and outputting the image based on the apparatus information thus registered when an image forming apparatus selected by a user among the first and second image forming apparatuses does not output the image, and when the second image forming apparatus is selected as the substitute apparatus, the second request transmitting unit is configured to transmit the second request to the second information processing apparatus, wherein the apparatus information includes information related to a type of a computer program that causes each of the first and second image forming apparatuses to operate, and the substitute apparatus retrieving unit is configured to preferentially select the image forming apparatus having the same type of the computer program as that of the image forming apparatus that does not output the image, as the substitute apparatus.

4. The image forming system according to claim 3, wherein the second information processing apparatus further comprises:

an image forming and outputting controller that controls forming and outputting an image performed by the second image forming apparatus;

a substitution permissibility determining unit that determines whether substitution of forming and outputting the image is permitted when the second request is received; and a substitute request processing unit that, when the substitution of forming and outputting the image is permitted, causes the image forming and outputting controller to transmit the third request to the second image forming apparatus.

5. The image forming system according to claim 4, wherein the substitution permissibility determining unit causes a display unit to display an operation screen for allowing the user to specify whether to permit the substitution of forming and outputting the image, and determines whether the substitution of forming and outputting the image is permitted based on a user operation.

6. The image forming system according to claim 4, wherein a substitute request transmitting unit transmits the second request including user identification information for identifying the user using the first information processing apparatus, and the substitution permissibility determining unit determines whether the substitution of forming and outputting the image is permitted, based on the user identification information included in the second request.

7. The image forming system according to claim 4, wherein the substitution permissibility determining unit determines whether the substitution of forming and outputting the image is permitted with reference to a predetermined condition.

\* \* \* \* \*